(12) United States Patent
Kiester et al.

(10) Patent No.: US 10,167,946 B2
(45) Date of Patent: Jan. 1, 2019

(54) ELECTRONIC TRANSMISSION RANGE SELECTION SYSTEM INCLUDING A BEZEL WITH LOCATING FEATURES

(71) Applicant: GM GLOBAL TECHNOLOGY OPERATIONS LLC, Detroit, MI (US)

(72) Inventors: Timothy A. Kiester, Sterling Heights, MI (US); Jared Van Dam, Royal Oak, MI (US); Eric O. Williams, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 341 days.

(21) Appl. No.: 15/149,794

(22) Filed: May 9, 2016

(65) Prior Publication Data
US 2017/0321796 A1    Nov. 9, 2017

(51) Int. Cl.
| | | |
|---|---|---|
| F16H 59/00 | (2006.01) | |
| F16H 59/02 | (2006.01) | |
| F16H 59/10 | (2006.01) | |

(52) U.S. Cl.
CPC .......... *F16H 59/0208* (2013.01); *F16H 59/10* (2013.01); *F16H 2059/026* (2013.01)

(58) Field of Classification Search
CPC . F16H 59/0208; F16H 59/10; F16H 2059/026
See application file for complete search history.

(56) References Cited

U.S. PATENT DOCUMENTS

| | | | | |
|---|---|---|---|---|
| 1,927,646 A | * | 9/1933 | Miller | ................ F16H 59/0208 403/122 |
| 3,732,746 A | * | 5/1973 | Fitzpatrick | ............ B60K 20/04 181/208 |
| 4,157,740 A | * | 6/1979 | Jackson | ................ B60K 20/04 180/328 |
| 4,524,633 A | * | 6/1985 | Murata | ................. B60K 20/04 248/583 |
| 5,560,253 A | * | 10/1996 | Ishikawa | ............... B60K 20/04 403/330 |
| 7,631,917 B2 | * | 12/2009 | Kwolek | ............. B60R 13/0206 296/24.34 |
| 8,127,638 B2 | * | 3/2012 | Kumagai | ........... F16H 59/0208 74/473.3 |
| 9,255,635 B2 | * | 2/2016 | Kessler | .................. B60K 20/04 |
| 2008/0115612 A1 | * | 5/2008 | Kumagai | ........... F16H 59/0208 74/473.3 |
| 2010/0147096 A1 | * | 6/2010 | Bergstrom | .......... B62D 33/073 74/473.3 |
| 2013/0145882 A1 | * | 6/2013 | Hartleip | ................. B60K 20/04 74/473.3 |

* cited by examiner

*Primary Examiner* — Victor L MacArthur
(74) *Attorney, Agent, or Firm* — Quinn IP Law

(57) ABSTRACT

A transmission shifter assembly includes a shifter and a shifter bezel. The shifter includes a shifter body and a shifter handle movably coupled to the shifter body. The shifter bezel includes a bezel body and defines a handle opening extending through the bezel body. The handle opening is sized to partially receive the shifter handle. The shifter handle extends through the handle opening. The transmission shifter assembly further includes a plurality of locating features, such as shock absorbers, interconnecting the shifter bezel and the shifter body in order to align the shifter bezel relative to the shifter.

13 Claims, 4 Drawing Sheets

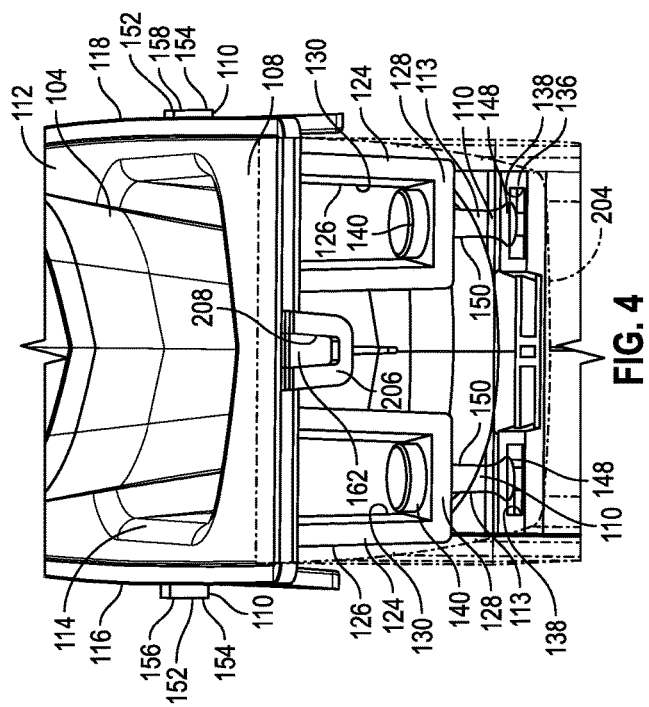
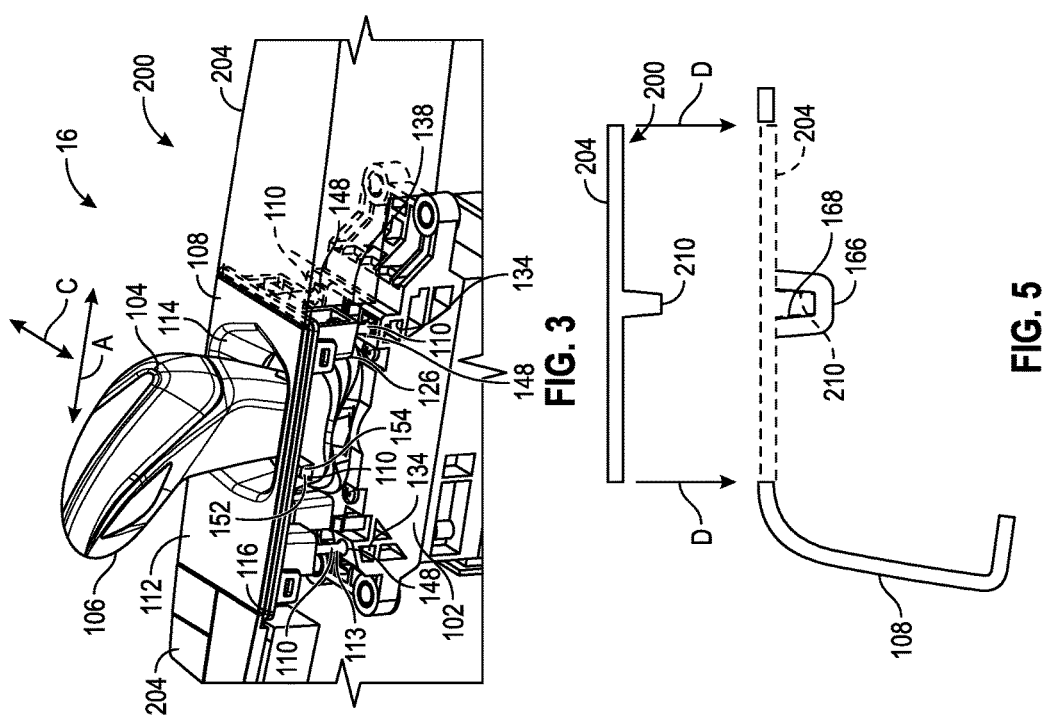

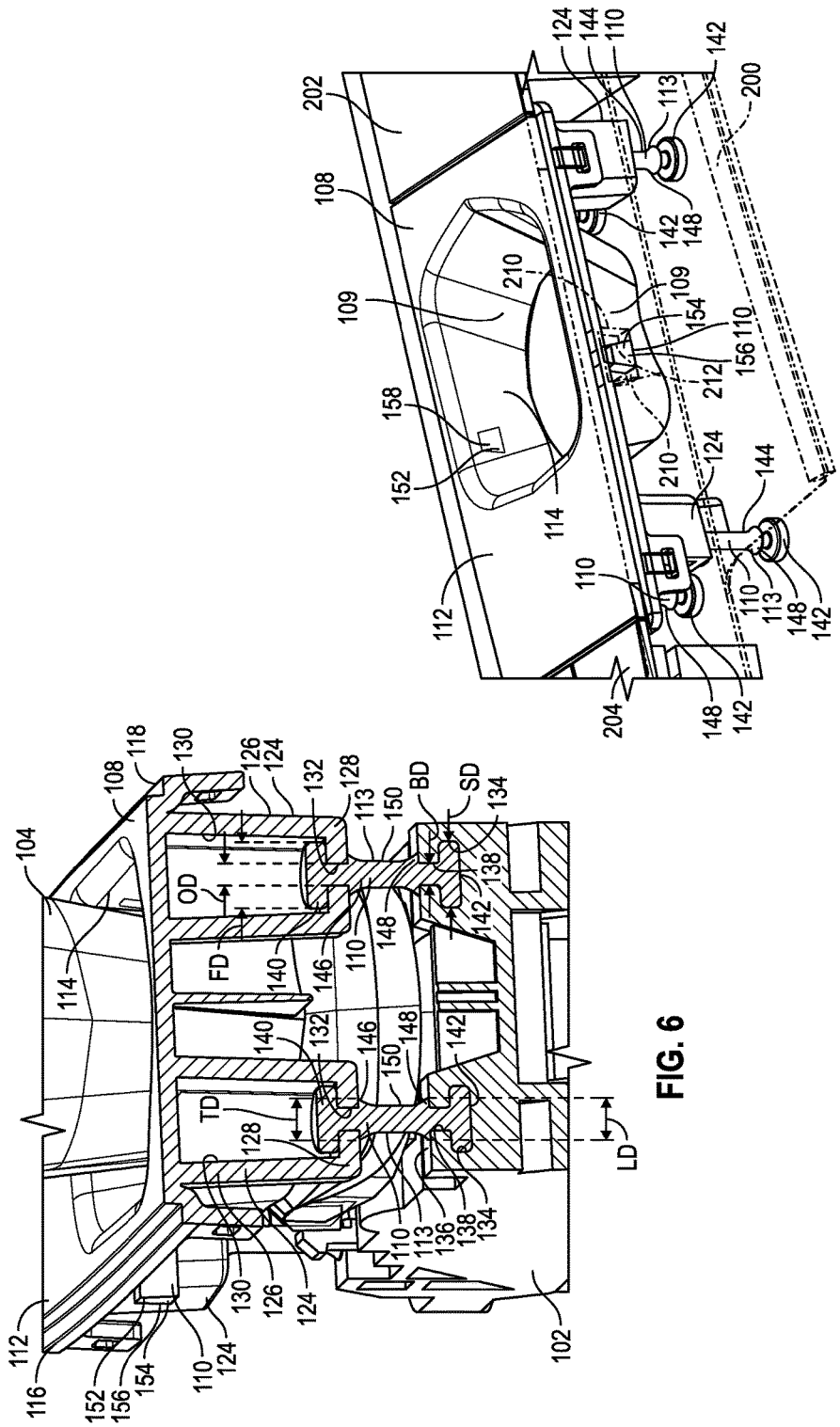

ELECTRONIC TRANSMISSION RANGE SELECTION SYSTEM INCLUDING A BEZEL WITH LOCATING FEATURES

TECHNICAL FIELD

The present disclosure relates to an electronic transmission range selection (ETRS) system including a bezel with locating features.

BACKGROUND

Motor vehicles include a power plant (e.g., engine or electric motor) capable of producing driving power and a transmission for transferring the driving power to a driveline for driving a set of wheels at selected gear ratios. Automatic transmissions shift automatically to the appropriate gear ratio based on various vehicle operating conditions including speed and torque. Typically, a desired transmission operating mode is selected by the vehicle operator. The modes provided by most automatic transmissions generally include Park, Neutral, Reverse and Drive. In Drive, the automatic transmission automatically shifts between three or more different forward gear ratios based on the vehicle operating conditions.

SUMMARY

The present disclosure relates to a transmission shifter assembly including a shifter and a shifter bezel partially surrounding the shifter. The bezel has locating features in order to properly locate and align the bezel relative to the shifter within a 0.5 millimeters dimensional tolerance. In certain embodiments, the shifter includes a shifter body and a shifter handle movably coupled to the shifter body. The shifter bezel includes a bezel body and defines a handle opening extending through the bezel body. The handle opening is sized to partially receive the shifter handle. The shifter handle extends through the handle opening. The transmission shifter assembly further includes a plurality of locating features, such as shock absorbers, interconnecting the shifter bezel and the shifter body in order to align the shifter bezel relative to the shifter.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic, perspective side view of the ETRS shifter assembly shown in FIG. 2 and console trim plates.

FIG. 4 is a schematic, perspective rear view of one of the console trim plates and the ETRS shifter assembly shown in FIG. 3.

FIG. 5 is a schematic, cross-sectional view showing the locating features of the console trim plate and the ETRS shifter assembly shown in FIG. 2.

FIG. 6 is a schematic, perspective, cross-sectional view showing shock absorbers coupled between a shifter bezel and a shifter body of the ETRS shifter assembly shown in FIG. 2.

FIG. 7 is a schematic, perspective view of the console trim plates and the shifter bezel shown in FIG. 2.

DETAILED DESCRIPTION

Figure 1:
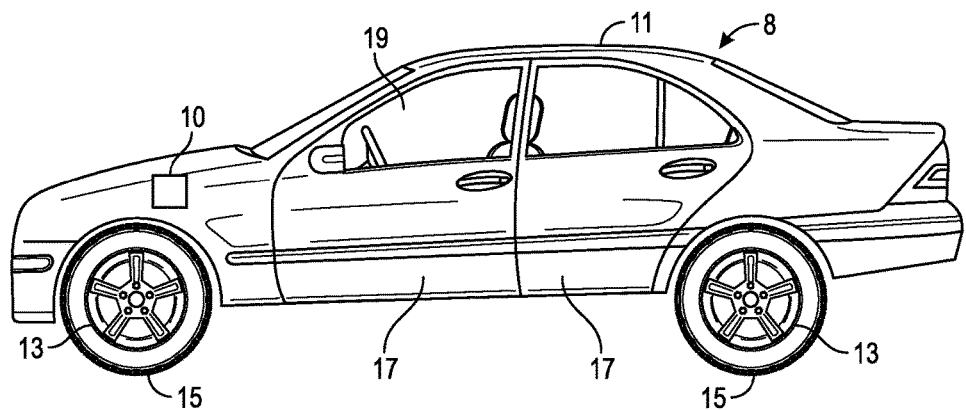
FIG. 1 is a schematic illustration of a vehicle including an ETRS system.

Referring to the figures wherein like reference numbers represent like characters, FIG. 1 schematically illustrates a vehicle 8 including a vehicle body 11 and wheels 13 operatively coupled to the vehicle body 11. Each wheel 13 is operatively coupled to a tire 15. The tires 15 are therefore operatively coupled to the vehicle body 11 through the wheels 13. The vehicle body 11 defines a passenger compartment 19 and includes doors 17 to provide access to the passenger compartment 19. In addition to the doors 17, the vehicle 8 includes a powertrain 10 for propelling the vehicle 8.

Figure 2:
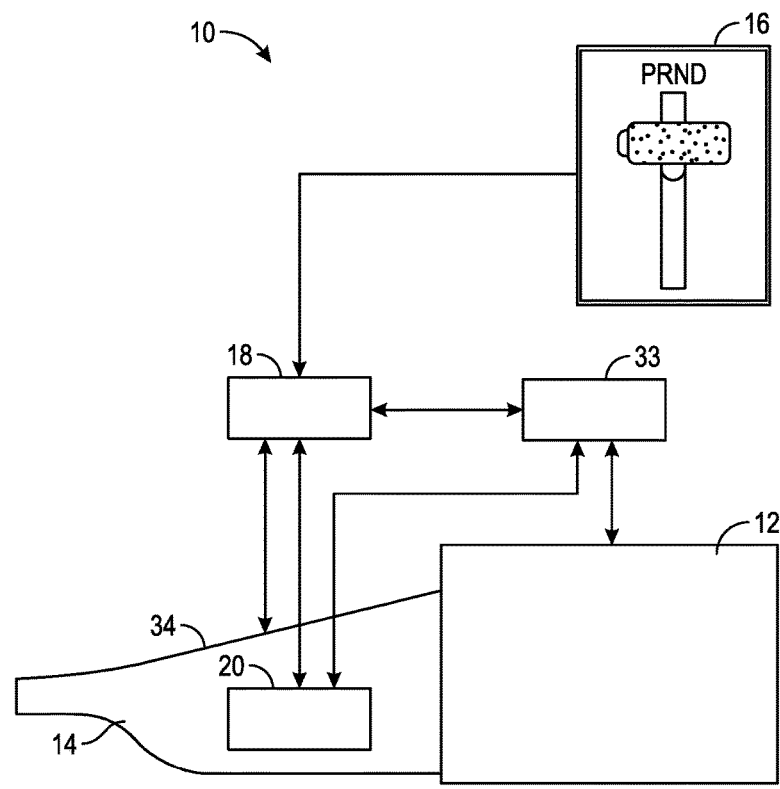
FIG. 2 is a schematic diagrammatic illustration of a partial powertrain of the vehicle shown in FIG. 1, wherein the ETRS system includes an ETRS shifter assembly.

FIG. 2 schematically illustrates a portion of the powertrain 10. The powertrain 10 includes an engine 12, such as an internal combustion engine, and an automatic transmission 14 operatively coupled to the engine 12. The engine 12 produces driving torque that is transferred through the transmission 14 at varying gear ratios to drive at least one pair of wheels 13 (FIG. 1). The transmission 14 is coupled to the vehicle body 11 (FIG. 1) and includes a system housing 34 for supporting various components. A transmission shifter assembly 16 is disposed inside the passenger compartment 19 (FIG. 1) and enables a vehicle operator to select various transmission range positions. The transmission shifter assembly 16 can include a lever, switches, dials, push buttons or any other type of input interface. The normal transmission range positions, including Park, Reverse, Neutral, and Drive (PRND) are selectable, as well as manual downshifts and tap-up, tap-down capabilities via actuation of the transmission shifter assembly 16. In operation, the transmission shifter assembly 16 sends a control signal to a transmission control module (TCM) 18 based on the selected operating range of the transmission 14. In the present disclosure, the transmission shifter assembly 16 may also be referred to as the ETRS shifter assembly.

The TCM 18 signals an ETRS system 20 to shift the transmission 14 to the corresponding range in response to the control signal. The powertrain 10 includes an engine control module (ECM) 33 capable of receiving inputs from and send control signals to the engine 12. Additionally, the ECM 33 interfaces with the ETRS system 20 and the TCM 18 to determine the operational range of the transmission 14.

With reference to FIGS. 3-9, the transmission shifter assembly 16 includes a shifter body 102 and a shifter handle 104 movably coupled to the shift body 102. The shifter handle 104 may be configured as a shifter lever 106 and, regardless of its specific configuration, can move with respect to shifter body 102 in order to allow the vehicle operator to select various transmission range positions (e.g., Park, Neutral, Reverse or Drive positions). Therefore, the shifter handle 104 is movably coupled to the shifter body 102. The shifter body 104 can be referred to as the shifter retainer because it supports and retains the shifter handle 106.

The transmission shifter assembly 16 is disposed inside the passenger compartment 19 (FIG. 1) and is coupled to a console trim assembly 200. The console trim assembly 200 is also disposed inside the passenger compartment 19 (FIG. 1) and includes a plurality of console trim plates 204. The transmission shifter assembly 16 further includes a shifter bezel 108 that is flushed with at least one of the console trim plates 204. It is desirable to flush the shifter bezel 108 with at least one of the console trim plates 204 in order to enhance the aesthetic appeal of the passenger compartment 19 (FIG. 1) and facilitate manufacturing of the vehicle 8 (FIG. 1). To this end, the presently disclosed transmission shifter assembly 16 includes locating features 110 in the shifter bezel 108 and the console trim plates 204 for locating and aligning the shifter bezel 108 relative to the console trim plates 204. As a result, the shifter bezel 108 can be properly aligned with the console trim plates 204 within a dimensional tolerance of about 0.5 millimeters.

In the depicted embodiment, the locating features 110 include a plurality of shock absorbers 113 coupled between the shifter bezel 108 and the shifter body 102. In the present disclosure, the term "shock absorber" means a mechanical device designed to absorb and damp shock impulses. Each shock absorber 113 is wholly or partly made of a resilient material, such as rubber, in order to minimize vibratory motion in the shifter bezel 108 with respect to the console trim plates 204, thereby helping align the shifter bezel 108 with the console trim plates 204 even when the transmission shifter assembly 16 experiences vibrations.

The shifter bezel 108 includes a bezel body 112 and defines a handle opening 114 extending through the bezel body 112. The bezel body 112 may be substantially planar such that it can be flushed with the console trim plates 204. The handle opening 114 is configured and sized to receive the shifter handle 104. Therefore, the shifter handle 104 extends through the bezel body 112 through the handle opening 114. The size of the handle opening 114 allows the shifter handle 104 to move relative to the shifter body 102 and the bezel body 112. The shifter bezel 108 may further include an enclosure wall 109 protruding from the bezel body 112 and disposed around the handle opening 114.

The bezel body 112 includes a first lateral edge 116 and a second lateral edge 118 opposite the first lateral edge 116. The bezel body 112 further includes a front edge 120 interconnecting the first lateral edge 116 and the second lateral edge 118. Moreover, the bezel body 112 includes a rear edge 122 opposite the front edge 120. The rear edge 122 interconnects the first lateral edge 116 and the second lateral edge 118.

The shifter bezel 108 additionally includes a plurality of bezel extensions 124 protruding from the bezel body 112 toward the shifter body 102. In the depicted embodiment, the shifter bezel 108 includes four bezel extensions 124 for stabilizing the transmission shifter assembly 16 along the fore-aft direction, which is indicated by double arrows A (FIG. 3), and the cross-car direction, which is indicated by double arrows C (FIG. 3). Two bezel extensions 124 are closer to the rear edge 122 than to the front edge 120 of the bezel body 112. Two bezel extensions 124 are closer to the front edge 120 than to the rear edge 122 of the bezel body 112. Two bezel extensions 124 are closer to the first lateral edge 116 than to the second lateral edge 118. Two bezel extensions 124 are closer to the second lateral edge 118 than to the first lateral edge 116. The positions of the bezel extensions 124 relative to the first lateral edge 116, the second lateral edge 118, the front edge 120, and the rear edge 122, as described above, assist in stabilizing the transmission shifter assembly 16 along the fore-aft direction, which is indicated by double arrows A (FIG. 3), and the cross-car direction, which is indicated by double arrows C (FIG. 3).

Each bezel extension 124 includes at least one lateral wall 126 and at least one support wall 128 directly connected to the lateral wall 126. The support wall 128 is configured to partly support one of the shock absorbers 113. The lateral wall 126 and the support wall 128 jointly define an inner extension cavity 130 configured, shaped, and sized to partly receive one of the shock absorbers 113. Moreover, the lateral wall 126 may have a substantially U-shape to accommodate part of one of the shock absorbers 113. Each bezel extension 124 further defines an extension opening 132 extending through the support wall 128. The extension opening 132 is in communication with the inner extension cavity 130, thereby allowing one of the shock absorbers 113 to extend through the support wall 128. Accordingly, each extension opening 132 leads to one of the inner extension cavities 130. The extension opening 132 has a maximum cross-sectional dimension OD (e.g., diameter). The support wall 128 is the part of the bezel extension 124 that is closest to the shifter body 102.

The shifter body 102 supports the shock absorbers 113. To do so the, shifter body 102 defines a plurality of inner body cavities 134 each configured, shaped, and sized to partially receive one of the shock absorbers 113. The shifter body 102 further includes a top body wall 136 and defines a plurality of body openings 138 extending through the top body wall 136. Each body opening 138 is in communication with one of the inner body cavities 134. Accordingly, each body opening 138 leads to one of the inner body cavities 134, thereby allowing one of the shock absorbers 113 to extend through the top body wall 136 via the body opening 138. The body opening 138 has a maximum cross-sectional dimension BD (e.g., diameter).

The shock absorbers 113 interconnect the shifter body 102 and the shifter bezel 108 in order minimize vibratory motion in the shifter bezel 108, thereby maintaining the shifter bezel 108 substantially flushed with the console trim plates 204. Each shock absorber 113 includes a first or upper disc 140, a second or lower disc 142, and a bar 144 interconnecting the first disc 140 and the second disc 142. The first disc 140 of the shock absorber 113 is disposed inside one of the bezel extensions 124 in order to secure the shock absorber 113 to the shifter bezel 108. Specifically, the first disc 140 of the shock absorber 113 is disposed in one of the inner extension cavities 130. The maximum cross-sectional dimension FD (e.g., diameter) of the first disc 140 is larger than the maximum cross-sectional dimension OD (e.g., diameter) of the extension opening 132. As such, the first disc 140 is secured inside the inner extension cavity 130 and cannot exit through the extension opening 132, while a portion of the bar 144 extends through the extension opening 132.

Each second disc 142 is disposed inside the shifter body 102 in order to secure the shock absorbers 113 to the shifter body 102. In particular, the second disc 142 of the shock absorber 113 is disposed in one of the inner body cavities 134 of the shifter body 102. The maximum cross-sectional dimension SD (e.g., diameter) of the second disc 142 is larger than the maximum cross-sectional dimension BD (e.g., diameter) of the body opening 138. As such, the second disc 142 is secured inside the inner body cavity 134 and cannot exit through the body opening 138, while a portion of the bar 144 extends through the body opening 138.

The bar 144 includes a first tapered portion 146, a second tapered portion 148, and a central bar portion 150 interconnecting the first tapered portion 146 and the second tapered portion 148. In the present disclosure, the term "tapered portion" means a portion of the bar 144 that has a continuously increasing (or decreasing) cross-sectional dimension (e.g., diameter). Accordingly, the cross-sectional dimension (e.g., diameter) of the first tapered portion 146 increases in a direction toward the bezel body 112 until it reaches a maximum cross-sectional dimension TD (e.g., diameter). The cross-sectional dimension (e.g., diameter) of the second tapered portion 146 increases in a direction away from the bezel body 112 until it reaches a maximum cross-sectional dimension LD (e.g., diameter). The maximum cross-sectional dimension LD of the second tapered portion 146 is greater than the maximum cross-sectional dimension BD (e.g., diameter) of the body opening 138 in order to securely couple the shock absorber 113 to the shift body 102. The maximum cross-sectional dimension TD of the first tapered portion 146 is greater than the maximum cross-sectional dimension OD (e.g., diameter) of the extension opening 132 in order to securely couple the shock absorber 113 to the shifter bezel 108.

As discussed above, the transmission shifter assembly 16 includes locating features 110 in the shifter bezel 108. Thus, the locating features 110 include bezel locating features 152 that are part of the shifter bezel 108. In the depicted embodiment, the bezel locating features 152 include bezel wedges 154 coupled to the bezel body 112. The bezel wedges 154 have a substantially V-shape and can be tuned, depending on the specific vehicle dimensions, in order to ensure proper alignment of the shifter bezel 108 relative to the console trim plates 204 along the fore-aft direction (which is indicated by double arrows A (FIG. 3)) and the cross-car direction (which is indicated by double arrows C (FIG. 3)).

Figure 8:
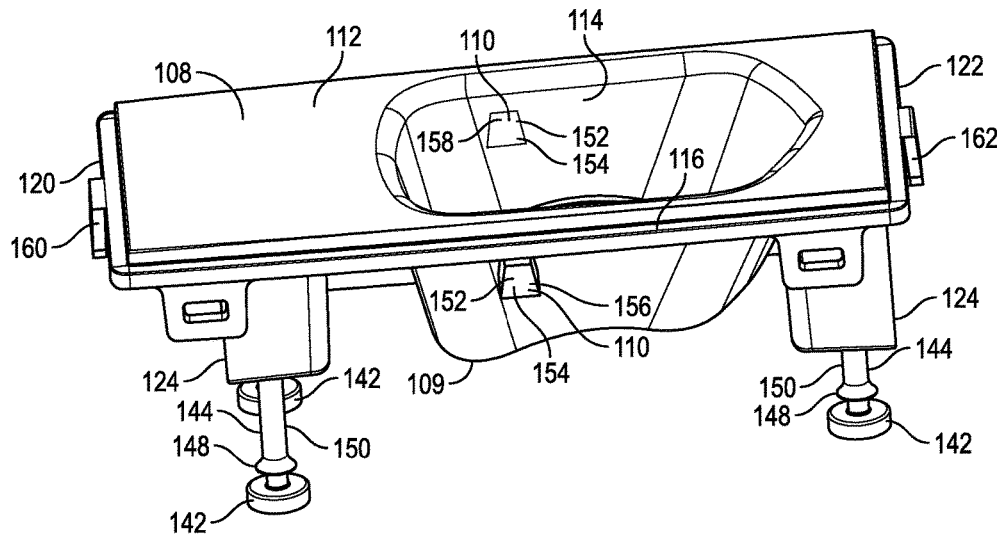
FIG. 8 is a schematic, perspective side view of the shifter bezel shown in FIG. 2.
Figure 9:
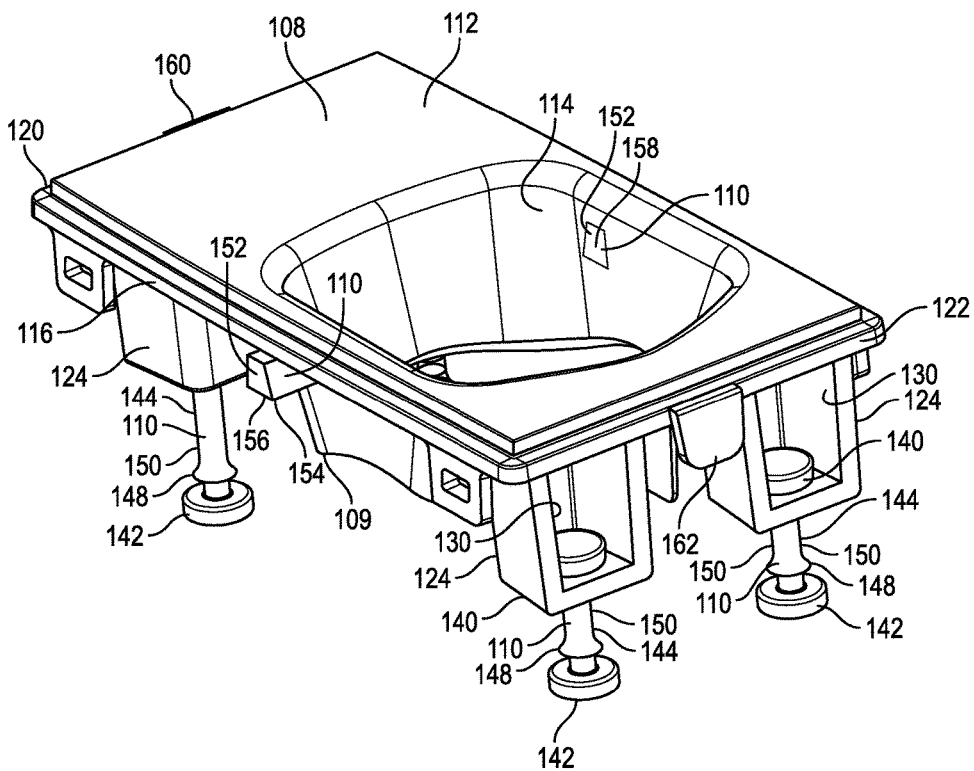
FIG. 9 is a schematic, perspective front view of the shifter bezel shown in FIG. 2.

In the depicted embodiment, the bezel wedges 154 include a first bezel wedge 156 disposed along the first lateral edge 116 of the bezel body 112 and a second bezel wedge 158 disposed along the second lateral edge 118 of the bezel body 112. The first bezel wedge 156 and the second bezel wedge 158 are coupled to the bezel body 112. For instance, as shown in FIG. 8, the first bezel wedge 156 and the second bezel wedge 158 can protrude from the enclosure wall 109 toward the first lateral edge 116 and the second lateral edge 118, respectively. The bezel wedges 154 further includes a third bezel wedge 160 disposed along the front edge 120 of the bezel body 112 and a fourth bezel wedge 162 disposed along the rear edge 122 of the bezel body 112. The third bezel wedge 160 and the fourth bezel wedge 162 are coupled to the bezel body 112. For example, the third bezel wedge 160 and the fourth bezel wedge 162 can be attached directly to the front edge 120 and the rear edge 122, respectively. The arrangement of the bezel wedges 154, as described above, ensures proper alignment of the shifter bezel 108 relative to the console trim plates 204 along the fore-aft direction (which is indicated by double arrows A (FIG. 3)) and the cross-car direction (which is indicated by double arrows C (FIG. 3)).

As shown in FIG. 4, hollow console wedges 206 extend from the console trim plates 204. One of the hollow console wedge 206 mates with the third bezel wedge 160, and another hollow console wedge 206 mates with the fourth bezel wedge 162 in order to properly align the shifter bezel 108 with the console trim plates 204. Each hollow console wedge 206 defines a console wedge cavity 208 configured, shaped, and sized to receive the bezel wedges 154.

As shown in FIG. 7, solid console wedges 210 also extend from the console trim plates 204. Specifically, two spaced apart solid console wedges 210 protrude from the console trim plates 204 and define a substantially V-shaped cavity 212 between them. The substantially V-shaped cavity 212 is configured, shaped, and sized to receive the bezel wedges 154 (i.e., either the bezel wedge 156 or the second bezel wedge 158) in order to ensure proper alignment of the shifter bezel 108 relative to the console trim plates 204 along the fore-aft direction (which is indicated by double arrows A (FIG. 3)) and the cross-car direction (which is indicated by double arrows C (FIG. 3)). The solid console wedges 210 may be referred to as trim locating features.

As shown in FIG. 5, the solid console wedges 210 of the console trim assembly 200 can also be disposed in a hollow bezel wedge 166 of the shifter bezel 108 in order to align the console trim plate 204 with the shifter bezel 108. To do so, the console trim plate 204 and the solid console wedge 210 are jointly moved in a downward direction D toward the shifter bezel 108 until the solid console wedge 210 is disposed in a bezel wedge cavity 168 defined by the hollow bezel wedge 166.

While the best modes for carrying out the teachings have been described in detail, those familiar with the art to which this disclosure relates will recognize various alternative designs and embodiments for practicing the teachings within the scope of the appended claims. The transmission shifter assembly illustratively disclosed herein may be suitably practiced in the absence of any element which is not specifically disclosed herein.

The invention claimed is:

1. A vehicle, comprising:
   a console trim plate;
   a shifter bezel coupled to the console trim plate;
   a shifter coupled to the shifter bezel, wherein the shifter includes a shifter body and a shifter handle movably coupled to the shifter body;
   a plurality of shock absorbers interconnecting the shifter bezel and the shifter in order to align the console trim plate with the shifter bezel; and
   wherein each of the shock absorbers includes a first disc, a second disc and a bar interconnecting the first disc and the second disc.

2. The vehicle of claim 1, wherein the shifter bezel includes a bezel body and a plurality of bezel locating features coupled to the bezel body, and the console trim plate includes a plurality of trim locating features coupled to the bezel locating features.

3. The vehicle of claim 2, wherein the bezel locating features include a plurality of bezel wedges coupled to the bezel body.

4. The vehicle of claim 3, wherein the bezel body includes a first lateral edge and a second lateral edge opposite the first lateral edge, and the bezel wedges includes a first wedge disposed along the first lateral edge and a second wedge disposed along the second lateral edge.

5. The vehicle of claim 4, wherein the bezel body includes a front edge interconnecting the first lateral edge and the second lateral edge, the bezel body includes a rear edge opposite the front edge, the rear edge interconnects the first lateral edge and the second lateral edge, and the bezel wedges includes a third wedge protruding from the front edge and a fourth wedge protruding from the rear edge.

6. The vehicle of claim 1, wherein the first disc of each of the shock absorbers is coupled to the shifter bezel.

7. The vehicle of claim 6, wherein the second disc of each of the shock absorbers is coupled to the shifter body.

8. The vehicle of claim 7, wherein the shifter body includes a plurality of inner body cavities and a plurality of body openings, each of the body openings leads to one of the inner body cavities, and the bar of each of the shock absorbers is disposed in one of the body openings.

9. The vehicle of claim 8, wherein the second disc of each of the shock absorbers is disposed in one of the inner body cavities.

10. The vehicle of claim 9, wherein the shifter bezel includes a plurality of bezel extensions protruding from the bezel body toward the shifter body, each of the bezel extensions defines an inner extension cavity and an extension opening leading to the inner extension cavity, and the bar of each of the shock absorbers is disposed in the extension opening.

11. The vehicle of claim 10, wherein the first disc is disposed in the inner extension cavity.

12. The vehicle of claim 1, wherein each of the shock absorbers is at least partly made of a resilient material in order to minimize vibratory motion in the shifter bezel.

13. The vehicle of claim 1, wherein the shifter bezel includes a bezel body and a plurality of bezel locating features coupled to the bezel body, and the console trim plate includes a plurality of trim locating features coupled to the bezel locating features, the bezel locating features include a plurality of bezel wedges coupled to the bezel body, the bezel body includes a first lateral edge and a second lateral edge opposite the first lateral edge, and the bezel wedges includes a first wedge disposed along the first lateral edge and a second wedge disposed along the second lateral edge, the bezel body includes a front edge interconnecting the first lateral edge and the second lateral edge, the bezel body includes a rear edge opposite the front edge, the rear edge interconnects the first lateral edge and the second lateral edge, and the bezel wedges includes a third wedge protruding from the front edge and a fourth wedge protruding from the rear edge, each of the shock absorbers includes a first disc, a second disc and a bar interconnecting the first disc and the second disc, the first disc of each of the shock absorbers is coupled to the shifter bezel, the second disc of each of the shock absorbers is coupled to the shifter body, the shifter body includes a plurality of inner body cavities and a plurality of body openings, each of the body openings leads to one of the inner body cavities, and the bar of each of the shock absorbers is disposed in one of the body openings, the second disc has a disc, each of the body openings has an opening diameter, the disc diameter is greater than the opening diameter, the second disc of each of the shock absorbers is disposed in one of the inner body cavities, the shifter bezel includes a plurality of bezel extensions protruding from the bezel body toward the shifter body, each of the bezel extensions defines an inner extension cavity and an extension opening leading to the inner extension cavity, and the bar of each of the shock absorbers is disposed in the extension opening, the first disc is disposed in the inner extension cavity, and each of the shock absorbers is wholly made of a resilient material in order to minimize vibratory motion in the shifter bezel.

* * * * *